Dec. 14, 1926.

S. Z. DE FERRANTI 1,611,103

ALTERNATING CURRENT ELECTRICITY METER

Filed Feb. 28, 1924

S. Z. de Ferranti
inventor

By Marks & Clerk
Attys.

Patented Dec. 14, 1926.

1,611,103

UNITED STATES PATENT OFFICE.

SEBASTIAN ZIANI DE FERRANTI, OF HOLLINWOOD, ENGLAND, ASSIGNOR TO FERRANTI, LIMITED, OF HOLLINWOOD, LANCASTER, ENGLAND.

ALTERNATING-CURRENT ELECTRICITY METER.

Application filed February 28, 1924, Serial No. 695,863, and in Great Britain June 29, 1923.

This invention relates to improvements in and relating to alternating current electricity meters of the watt-hour induction motor type. In these meters, accuracy of recording under variations in load suffers on account of the falling characteristic which such meters possess.

The drooping characteristic in due to the fact that the series field has a braking effect upon the rotor of the meter; the series field naturally varies with variation in load current and thus the braking of the rotor varies with load current, thereby causing errors in the readings of the meter.

It is the object of the present invention to provide improved or simplified means for the compensation of this variation in braking effect.

The invention consists in an electricity meter of the type described including in combination a shunt magnetic field circuit, a series magnetic field circuit, a rotor member rotated by the mutual interaction of said fields and a shaded pole induction motor element coacting with said rotor member to produce an auxiliary driving torque whose magnitude varies with variation in load current.

Referring to the accompanying diagrammatic drawings:—

Figure 1:
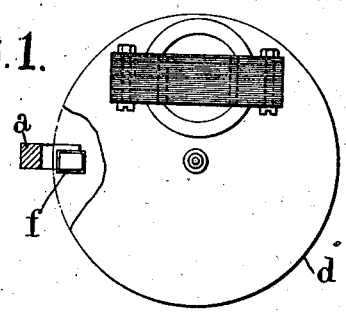
Figure 1 represents a plan view partly in section of one convenient construction in accordance with the present invention.
Figure 2:
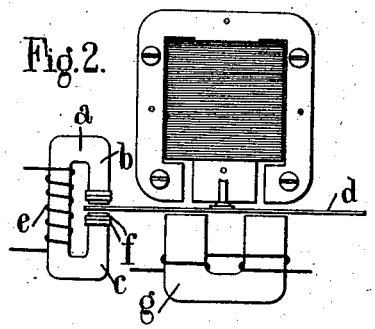
Figure 2 is a side elevational view corresponding to Figure 1.

In carrying the invention into effect in one form by way of example, I provide an auxiliary motor element which co-operates with the main disc or other form of rotor or may co-operate with an additional rotor provided on the meter spindle. This auxiliary motor element comprises conveniently a C shaped electromagnet $a$ (Figures 1 and 2) whose pole pieces $b$ and $c$ rest respectively above and below the rotor disc $d$ and which is energized by an electromagnet coil $e$ connected in series with the ordinary series circuit of the meter. Naturally this coil may, if desired, be connected in a subsidiary circuit or may be otherwise excited, provided that it produces a field whose magnitude is at all times substantially proportional to the load current of the meter. The pole pieces are bifurcated and one of each of the bifurcations is furnished with a pair of copper rings $f$, thus producing in operation a driving torque which increases with increase in load current.

If desired, one only of the pole pieces may be bifurcated and provided with conducting rings or one or both of the poles may be otherwise shaded to produce a similar effect.

Figure 3:
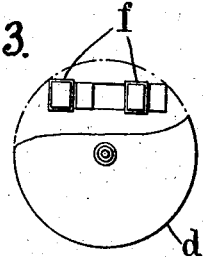
Figure 3 is a plan view partly in section of a modification.
Figure 4:
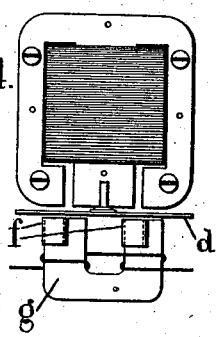
Figure 4 is a side elevational view corresponding to Figure 3.

According to a modification, instead of providing an additional electromagnet, I modify the normal series electromagnet core so that it may furnish the necessary auxiliary driving torque in accordance with the present invention. In this example (Figures 3 and 4) as applied to that form of the well-known Ferranti alternating current induction motor meter which embodies a three-limb shunt electromagnet and a U-shaped series electromagnet $g$ disposed on opposite sides of a disc rotor, I bifurcate both pole pieces of the series electromagnet core $g$ and provide on one of each bifurcations an encircling conducting ring $f$. By this means, although increase in load current through the meter unavoidably increases the braking effect upon the rotor, the latter is substantially neutralized by increased driving torque.

Figure 5:
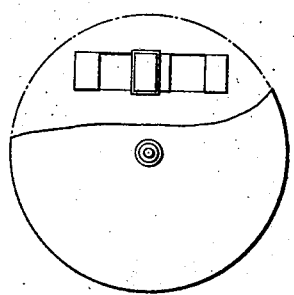
Figure 5 is a plan view partly in section of a further modification.
Figure 6:
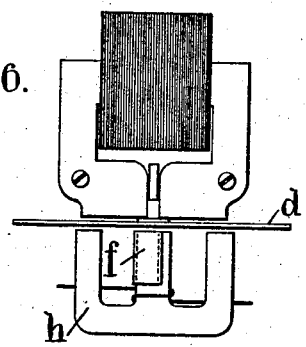
Figure 6 is a side elevational view corresponding to Figure 5.

According to a further modification (Figures 5 and 6) as applied to that form of Ferranti alternating current induction motor meter which embodies a three-limbed series electromagnet $h$ and a U-shaped shunt electromagnet, disposed on opposite sides of a disc rotor $d$, I bifurcate the centre limb of the former electromagnet core and furnish one of the bifurcations with an encircling conducting ring $f$.

Figure 7:
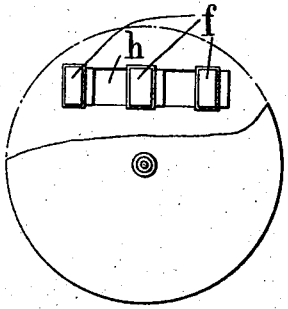
Figure 7 is a plan view partly in section of a still further modification.
Figure 8:
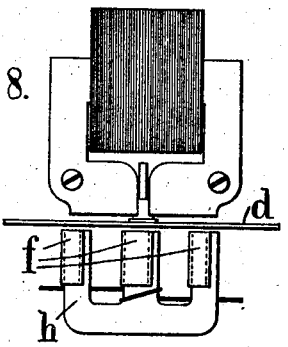
Figure 8 is a side elevational view corresponding to Figure 7.

According to the modification indicated in Figures 7 and 8 all three limbs are bifurcated and similarly provided with rings $f$.

It is important in all cases to so proportion and adjust the parts that shunt running does not take place.

Having now described my invention what I claim as new and desire to secure by Letters Patent is:—

An electricity meter of the type described including in combination a shunt magnetic field circuit, a series magnetic field circuit, a rotor member rotatable by the interaction of said fields and additional magnetic torque producing means comprising a core forming a part of said series magnetic field circuit and having a bifurcated pole forming prongs, and a conducting member encircling one of said prongs, substantially as and for the purposes set forth.

In testimony whereof I have signed my name to this specification.

SEBASTIAN ZIANI DE FERRANTI.